United States Patent [19]

Wijas et al.

[11] Patent Number: 5,081,674
[45] Date of Patent: Jan. 14, 1992

[54] DOUBLE ANNULAR RING SPEAKER GASKET

[75] Inventors: Thomas S. Wijas, Northbrook; Mark A. Enderich, Round Lake Beach, both of Ill.

[73] Assignee: Motorola, Inc., Schaumburg, Ill.

[21] Appl. No.: 522,720

[22] Filed: May 14, 1990

[51] Int. Cl.⁵ .................. H04M 1/00; H04R 25/00
[52] U.S. Cl. .................. 379/43.3; 379/419; 379/428; 379/437; 381/150; 381/158; 381/188
[58] Field of Search ............... 379/419, 428, 433, 437, 379/441, 443, 145, 417; 381/150, 188, 191, 205; 181/129

[56] References Cited

U.S. PATENT DOCUMENTS

| | | | |
|---|---|---|---|
| 2,404,877 | 7/1946 | Horlacher | 381/150 |
| 4,163,875 | 8/1979 | Cogan | 379/433 |
| 4,845,760 | 7/1989 | Awakowicz et al. | 381/188 |
| 4,920,564 | 4/1990 | Allkins | 379/437 |
| 4,974,258 | 11/1990 | Arzounian et al. | 379/145 |
| 4,984,268 | 1/1991 | Brown et al. | 379/433 |
| 5,042,071 | 8/1991 | Stinauer et al. | 381/158 |

FOREIGN PATENT DOCUMENTS 2225192  5/1990  United Kingdom ............... 379/411

Primary Examiner—James L. Dwyer
Assistant Examiner—William Cumming
Attorney, Agent, or Firm—Rolland R. Hackbart

[57] ABSTRACT

A double annular ring gasket (202) interfaces a speaker (201) to a housing (200) in a portable radiotelephone, providing a conformal and acoustic seal between the speaker (201) and the housing (200), and compensating for dimensional tolerance between the housing (200) and the circuit board subassembly (204) on which the speaker (201) is mounted. The gasket (201) includes outer ring (205), inner ring (206) and intermediate ring (207) therebetween. The gasket (202) is inserted into a cavity (203) in the housing (200). Then, the speaker (201), as part of a printed circuit board subassembly (204), is pressed into place against the outer ring (205) of gasket (202) to form an axial seal and the inner ring (206) is deformed radially by the speaker (201) to form a conformal seal.

11 Claims, 1 Drawing Sheet

DOUBLE ANNULAR RING SPEAKER GASKET

BACKGROUND OF THE INVENTION

The present invention relates generally to radiotelephone communications and in particular to acoustic sealing of portable radiotelephone speakers.

In radiotelephones, a user communicates by means of a handset (see U.S. Pat. No. Des. 286,778) that includes a speaker at one end that is placed close to the user's ear and a microphone at the other end that is held close to the user's mouth. A portable radiotelephone incorporates the handset into the transceiver (see U.S. Pat. No. Des. 269,873).

A portable radiotelephone requires a good tight acoustic seal between the speaker and the portable radiotelephone housing for satisfactory acoustical performance, in particular for good low frequency response. At the same time, since the sound from the speaker causes the portable radiotelephone housing to vibrate if it is not acoustically insulated from the speaker, the acoustic seal must also insulate the portable radiotelephone housing from the speaker to prevent this vibration. If the speaker excessively vibrates the portable radiotelephone housing, the radiotelephone performance can be degraded to an unacceptable level. In some countries there is even a requirement specifying how much the speaker can move with respect to the portable radiotelephone housing to ensure the integrity of the acoustic seal and acoustic performance.

In a portable radiotelephone, this acoustic seal is typically implemented by a flat gasket that forms the interface between the speaker and the portable radiotelephone housing. It is bonded by adhesives to the speaker or housing, or to both the speaker and housing. This flat gasket also compensates for the dimensional tolerances of portable radiotelephone subassemblies in a direction axial to the plane of the gasket. This flat gasket seals the speaker only in the direction axial to the plane of the gasket. Alignment, and assembly in general, is not easy because adhesives do not allow easy placement and positioning of the speaker, housing, and gasket with respect to each other. To insure proper alignment during the assembly process, a special tool or fixture is often required. If there is misalignment, the adhesive seal makes repair and reassemble difficult. Moreover, this acoustic seal assembly requires that subassemblies of a portable radiotelephone to have very tight dimensional tolerances, otherwise misalignment and consequential repair become more probable.

Accordingly, there is a resulting need for a gasket that will allow easy assembly and disassembly of the acoustically sealed speaker, and also enable the other subassemblies of a portable radiotelephone to accept wider dimensional tolerance windows that can be compensated by the gasket in the acoustic seal.

OBJECTS OF THE INVENTION

Accordingly, it is an object of the present invention to provide a unique speaker gasket which acoustically seals the speaker to the earpiece of a housing without the use of adhesives or other bonding agents, thereby allowing the speaker to be easily and reliably assembled without a degradation of radio performance.

It is another object of the present invention to provide a unique speaker gasket that both conformally and acoustically seals the speaker in the radial and axial directions, respectively, thereby compensating for dimensional tolerances between subassemblies thereof.

DETAILED DESCRIPTION OF THE PREFERRED EMBODIMENT

According to the present invention, a conformal acoustic seal is formed by a unique gasket between a speaker and a portable radiotelephone housing. The gasket of the present invention fixes the speaker with respect to the housing thereby both acoustically and conformally isolating the speaker from the housing and preventing the speaker from moving excessively with respect to the housing. By utilizing the present invention, both a conformal and an acoustic seal may be achieved between a speaker and its housing without the use of adhesives or other bonding materials at the interface.

Figure 1:
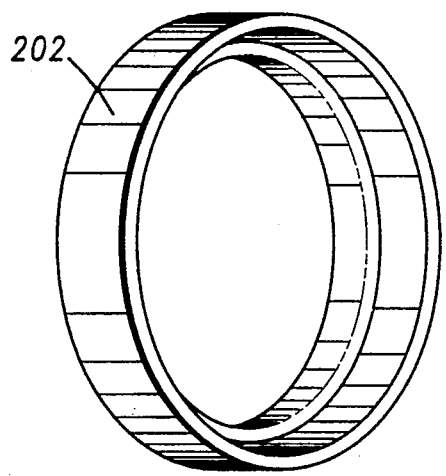
FIG. 1 illustrates a gasket according to the present invention.
Figure 2:
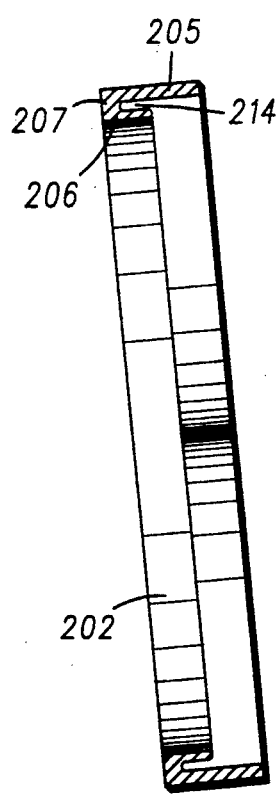
FIG. 2 illustrates a cross-sectional view of the gasket in FIG. 1.
Figure 3:
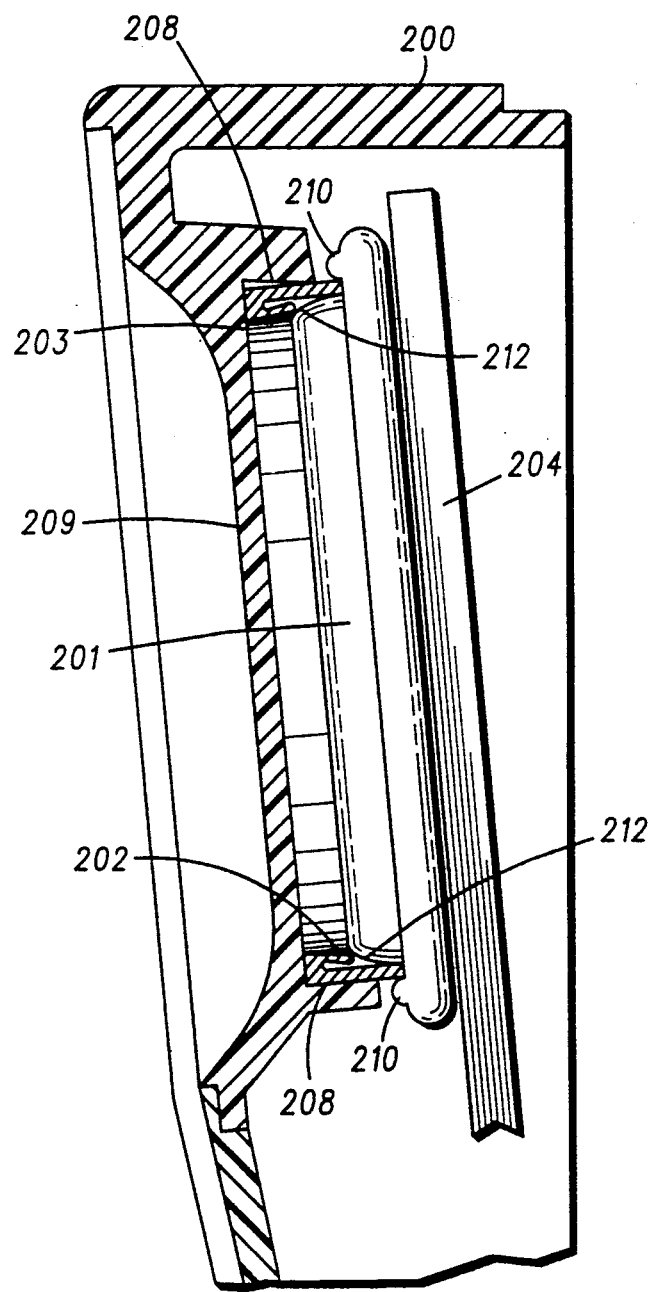
FIG. 3 illustrates a section of a portable radiotelephone housing including the gasket of FIG. 1 interfacing a speaker to the housing.

Referring to FIG. 1, there is illustrated a double annular ring gasket (202) which, in the preferred embodiment, is comprised of a single piece of molded elastomer. The gasket (202) has three elements, outer ring (205), inner ring (206), and intermediate ring (207) therebetween, as shown in more detail in FIG. 2. In FIG. 3, the gasket (202) seals speaker (201) in the housing (200) of a portable radiotelephone, such as, for example, the portable radiotelephone shown in U.S. Pat. No. Des. 269,873 and the model 9800XL portable cellular radiotelephone commercially available from the Cellular Subscriber Group of Motorola, Inc., located at 1475 West Shure Drive, Arlington Heights, Ill. 60004. The outer ring (205) of the gasket (202) has an outer diameter of 30.75 millimeters, a height of 3.75 millimeters, and a thickness of 1.62 millimeters. The outer ring (205) has a larger diameter than the inner ring (206). The inner ring (206) of the gasket (202) has an outer diameter of 23.87 millimeters, a height of 2.81 millimeters, and a thickness of 0.87 millimeters. The outer ring (205) has a larger height than the inner ring (206). The intermediate ring (207) of material between the outer ring (205) and the inner ring (206) of the gasket (202) has an outer diameter of 29.13 millimeters, a height of 0.93 millimeters, and a thickness of 0.76 millimeters. The intermediate ring (207) has a smaller height than the inner ring (206) thereby creating a hollow passage (214) between the projecting ends of the outer ring (205) and the inner ring (206). The inner ring (206) is also thinner than the inner ring (205).

The gasket (202) operates by inserting it into the cavity (203) on the earpiece side of the housing (200). The housing wall (208) retains the gasket (202) at the outer ring (205) when the gasket (202) is pressed into the housing cavity (203).

After the gasket (202) is pressed into place in the housing cavity (203), the outer ring (205) of the gasket (202) extends above the housing cavity wall (208). This extension above the housing cavity wall (208) prevents contact between the speaker (201) and the housing cavity portion (209) after the speaker (201) is pressed into place, thereby acoustically isolating them.

The speaker (201) in FIG. 3 has been mounted to a larger printed circuit board subassembly (204). The speaker (201) has a ridge (210) near its perimeter which is pressed against and seats the outer ring (205) of the gasket (202) where the outer ring (205) extends beyond the housing cavity wall (208). The face of speaker (202) has an inclined surface (212) rising from the ridge (210) that is pressed against the inner ring (206) when the speaker (201) is pressed against the gasket (202) during assembly of the housing (200). When the inclined surface (212) of speaker (201) is pressed against the inner ring (206), the projecting end of the inner ring (206) is forced outward, and the inner ring (206) is pressed radially against the outer ring (205), being at least partially deformed into the hollow passage (214) therebetween. In this manner, the novel gasket (202) forms both a conformal and an acoustic interface in the radial and axial directions, respectively, between the speaker (201) and the housing (200) without the use of adhesives or other bonding agents.

This acoustic interface provided by the gasket (202) insulates the speaker (201) from the housing (200) so that acoustic vibration does not degrade radiotelephone performance. The speaker (201) is mounted to a printed circuit board subassembly (204). Once the printed circuit board subassembly (204) is fastened to the housing (200) with the gasket (202), a tight acoustic seal is formed by the gasket (202) between the speaker (201) and the housing (200). The speaker (201) is fixedly positioned by the gasket (202) with respect to the housing (200) so that the speaker (201) resists vibration. The speaker (201) is also isolated by the gasket (202) so that speaker vibrations that do occur do not cause vibrations in the housing (200) and vice versa.

The gasket (202) of the present invention may be inserted into a telephone type housing (200), as illustrated in FIG. 3. The conformal interface formed by the gasket housing (202) of the present invention compensates for dimensional tolerances of portable radiotelephone subassemblies in two directions, axially and radially with respect to the speaker (201), because the resulting conformal interface enables circuit board subassembly (204) to move incrementally, is easily adjustable, and accommodates tolerance variations during assembly.

In summary, a novel double annular ring gasket has been described which isolates a speaker and fixes its position with respect to its housing. The unique gasket creates both a conformal and an acoustic seal in the radial and axial directions, respectively, with respect to the speaker that allows the speaker to be easily assembled into and removed from its housing without the use of adhesives or other bonding materials.

We claim:

1. A gasket adapted to disposed in a housing cavity for acoustically sealing a speaker in the housing cavity, said speaker having an inclined top surface, comprising:
    a) a first ring portion having a first diameter, a first height and a first thickness;
    b) a second ring portion having a second diameter, a second height, a second thickness, said second ring portion being concentric to said first ring portion, said second diameter being less than said first diameter, and said second height being less than said first height; and
    c) a third ring portion having third diameter, third height, and a third thickness, said third ring portion being concentric to said first ring portion and interposed between said first and second ring portions, said third diameter being less than said first diameter and greater than said second diameter, said third height being less than said second height for producing a hollow passage between said first and second ring portions, whereby said second ring portion is at least partially deformed into the hollow passage and conforming to the inclined top surface of the speaker when the speaker is inserted into and pressed against the housing cavity.

2. A telephone handset, comprising:
    a) a speaker having an inclined top surface;
    b) a housing having a cavity for accepting said speaker; and
    c) a gasket disposed in the cavity of said handset for acoustically sealing said speaker in the cavity of said handset, said gasket further comprising:
        i) a first ring portion having a first diameter, a first height and a first thickness;
        ii) a second ring portion having a second diameter, a second height, a second thickness, said second ring portion being concentric to said first ring portion, said second diameter being less than said first diameter, and said second height being less than said first height; and
        iii) a third ring portion having third diameter, third height, and a third thickness, said third ring portion being concentric to said first ring portion and interposed between said first and second ring portions, said third diameter being less than said first diameter and greater than said second diameter, said third height being less than said second height for producing a hollow passage between said first and second ring portions, whereby said second ring portion is at least partially deformed into the hollow passage and conforming to the inclined top surface of the speaker when the speaker is inserted into and pressed against the housing cavity.

3. The gasket according to claim 1, wherein the first thickness of the first ring portion is at least 1.62 millimeters.

4. The gasket according to claim 1, wherein the second thickness of the second ring portion is at least 0.87 millimeters.

5. The gasket according to claim 1, wherein the third thickness of third ring portion is at least 0.76 millimeters.

6. The gasket according to claim 1, wherein the first thickness of the first ring portion is at least 1.62 millimeters, the second thickness of the second ring portion is at least 0.87 millimeters, and the third thickness of third ring portion is at least 0.76 millimeters.

7. The telephone handset according to claim 2, wherein the first thickness of the first ring portion is at least 1.62 millimeters.

8. The telephone handset according to claim 2, wherein the second thickness of the second ring portion is at least 0.87 millimeters.

9. The telephone handset according to claim 2, wherein the third thickness of third ring portion is at least 0.76 millimeters.

10. The telephone handset according to claim 2, wherein the first thickness of the first ring portion is at least 1.62 millimeters, the second thickness of the second ring portion is at least 0.87 millimeters, and the third thickness of third ring portion is at least 0.76 millimeters.

11. The telephone apparatus according to claim 2, wherein said speaker is mounted on a printed circuit board.

* * * * *